United States Patent
Schulze-Wehnink et al.

(10) Patent No.: US 11,254,278 B2
(45) Date of Patent: Feb. 22, 2022

(54) AIRBAG ASSEMBLY

(71) Applicant: K.L. KASCHIER-UND LAMINIER GMBH, Bad Bentheim-Gildehaus (DE)

(72) Inventors: Rembert Schulze-Wehnink, Tutzing (DE); Albert Roring, Gronau-Epe (DE)

(73) Assignee: K.L. KASCHIER—UND LAMINIER GMBH, Bad Bentheim-Gildehaus (DE)

( * ) Notice: Subject to any disclaimer, the term of this patent is extended or adjusted under 35 U.S.C. 154(b) by 0 days.

(21) Appl. No.: 16/756,330

(22) PCT Filed: May 17, 2019

(86) PCT No.: PCT/EP2019/000154
§ 371 (c)(1),
(2) Date: Apr. 15, 2020

(87) PCT Pub. No.: WO2020/038597
PCT Pub. Date: Feb. 27, 2020

(65) Prior Publication Data
US 2021/0162943 A1 Jun. 3, 2021

(30) Foreign Application Priority Data
Aug. 24, 2018 (DE) .......................... 102018006703.4

(51) Int. Cl.
*B60R 21/2165* (2011.01)
*B60R 21/215* (2011.01)
*B60R 21/216* (2011.01)

(52) U.S. Cl.
CPC .. *B60R 21/2165* (2013.01); *B60R 2021/2161* (2013.01); *B60R 2021/21537* (2013.01)

(58) Field of Classification Search
CPC ...... B60R 21/2165; B60R 2021/21537; B60R 2021/2161; B60R 21/2342; B60R 2021/23557; B60R 21/215; B60R 21/205
See application file for complete search history.

(56) References Cited

U.S. PATENT DOCUMENTS 5,452,913 A * 9/1995 Hansen ............... B60R 21/2171
280/728.1
6,955,376 B1 10/2005 Labrie
(Continued)

FOREIGN PATENT DOCUMENTS

DE 19617758 C1 * 9/1997 .......... B60R 21/216
DE 202010003820 U1 * 9/2011 .......... B60R 21/215
(Continued)

*Primary Examiner* — Paul N Dickson
*Assistant Examiner* — Matthew D Lee
(74) *Attorney, Agent, or Firm* — Andrew Wilford

(57) ABSTRACT

The invention relates to an airbag assembly comprising an airbag through-opening arranged over the chute channel of the airbag, which opening is closed by at least one airbag flap and an, in particular sprayed-on, covering made of plastic and secured over the airbag flap, wherein the covering has at least one target break line at the edge of the airbag flap in order to enable the unfolding of the airbag cushion, and wherein the airbag flap is connected via a joining point to a flap support wall in a moulded manner, which is in contact with the inner side of the chute channel wall in a secured manner, wherein am additional flat element is inserted (as a cover) in the chute channel between the airbag cushion and the airbag flap, which flat element at least partially overs the airbag flap and the inner side of the chute channel wall.

4 Claims, 2 Drawing Sheets

(56) References Cited

U.S. PATENT DOCUMENTS

| | | | |
|---|---|---|---|
| 7,210,700 B2 | 5/2007 | Zagrodnicki | |
| 2003/0122356 A1* | 7/2003 | Fischer | B60R 21/205 |
| | | | 280/743.1 |
| 2005/0127641 A1* | 6/2005 | Cowelchuk | B60R 21/216 |
| | | | 280/728.3 |
| 2006/0043701 A1* | 3/2006 | Zagrodnicki | B60R 21/215 |
| | | | 280/728.3 |
| 2014/0117649 A1* | 5/2014 | Hoeing | B60R 21/215 |
| | | | 280/728.3 |
| 2014/0120285 A1* | 5/2014 | Hoeing | B32B 27/32 |
| | | | 428/36.1 |

FOREIGN PATENT DOCUMENTS

| | | | | |
|---|---|---|---|---|
| EP | 2096006 A | 9/2009 | | |
| WO | WO-2020038594 A1 * | 2/2020 | | B60R 21/215 |
| WO | WO-2020038596 A1 * | 2/2020 | | B60R 21/215 |

* cited by examiner

AIRBAG ASSEMBLY

CROSS REFERENCE TO RELATED APPLICATIONS

This application is the US-national stage of PCT application PCT/EP2019/000154 filed 17 May 2019 and claiming the priority of German patent application 102018006703.4 itself filed 24 Aug. 2018.

FIELD OF THE INVENTION

The invention relates to an airbag assembly comprising a hole provided over the launch pocket of the airbag and closed by at least one outer flap and an outer, in particular molded, cover made of plastic and mold bonded to the outer flap.

BACKGROUND OF THE INVENTION

In such an airbag assembly the cover has at least one target break line at the edge of the outer flap in order to enable unfolding of the airbag bag, and wherein the outer flap is unitarily formed via a hinge with an inner flap that is in secure contact with the inner face of the pocket side wall.

An airbag assembly of this type is known from EP 2 727 775 [US 2014/0117649]. In the case of airbag assemblies, the bag must be subjected to as little resistance as possible when the launch pocket is unfolded and opened, so that the airbag bag spreads quickly and without interference.

OBJECT OF THE INVENTION

The object of the invention is to improve an airbag assembly of the above-described type such that the airbag bag is exposed to low resistance forces when it is unfolded and emerges from the launch pocket.

SUMMARY OF THE INVENTION

The object according to the invention is achieved in that an additional sheet is inserted (as a cover) in the launch pocket between the airbag bag and the outer flap, which sheet at least partially covers the outer flap and the inner face of the pocket side wall.

Due to its very smooth surface, the additional sheet ensures safe and trouble-free exit of the unfolding impact bag. And this occurs with a high stability of the sheet in all temperature ranges and with a secure retention of the sheet in the launch pocket after the airbag has been triggered.

The additional sheet is securely held in the launch pocket when the impact bag emerges and unfolds if the additional sheet is connected, in particular welded, to the pocket side wall and/or to the outer flap. For this purpose, the lower end of the sheet can be positively connected to the lower end of the pocket side wall. The lower end of the sheet can reach under the lower end of the pocket side wall or the inner flap. Alternatively or additionally, the sheet can have a lateral tongue which engages behind a lateral projection of the pocket side wall or the inner flap.

The sheet has high strength and is dimensionally stable even at high temperatures if the sheet consists of a composite material with at least one layer of plastic strips or fibers, in particular made of thermoplastic polypropylene or polyester. Here, the plastic strips or fibers can form a fabric.

During opening, the sheet receives an additional distance if the sheet has a material reservoir in the form of an expansion section or corrugation along the hinge in the region of the hinge, through which the length of the sheet can be stretched to the outside. This facilitates pivoting of the sheet and prevents tearing off.

It is important for the function of the sheet that the outer surface of the sheet facing the impact bag has a high surface smoothness as a sliding surface. This high surface smoothness ensures that the frictional forces generated by the impact bag slide off.

BRIEF DESCRIPTION OF THE DRAWING

Embodiments of the invention are shown schematically in section in the drawings and are described in more detail below. In the drawings.

SPECIFIC DESCRIPTION OF THE INVENTION

Figure 1:
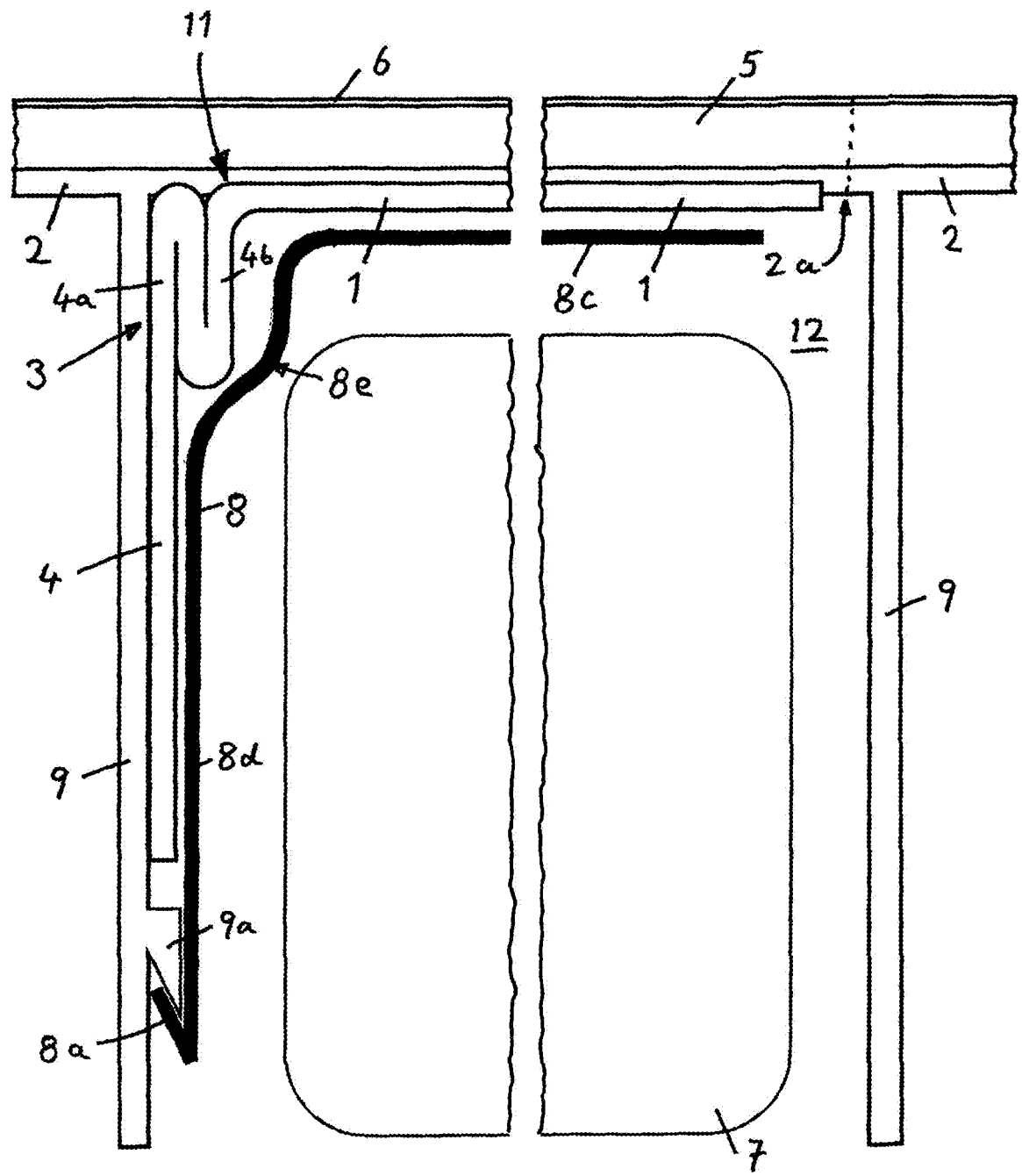
FIG. 1 shows the covered launch pocket having a sheet engaging with its tongue under a projection of the pocket side wall.

The airbag assembly has a compartment 12 that holds the impact bag 7 and forms the launch pocket, that is laterally defined by pocket side walls 9, and that is closed by a cover 2 having break lines 2a. The cover 2 forms a hole when, after the impact bag 7 has been triggered, the cover 2 breaks off at the target break lines 2a and opens to the outside. In this case, a door formed by the cover 2 remains securely attached to the rest of the cover at an edge by a hinge 11.

The cover 2 is covered by a foam layer 5 whose outer face carries a decorative surface coating 6.

At least one outer flap 1 of the hinge 11 is securely attached to the lower face of the cover 2 that itself is mold bonded to the outer flap 1. The material of the outer flap 1 and the manufacturing process are described in EP 2 727 775.

As shown in FIG. 1, the hole is closed by a single outer flap 1 extending from the hinge 11. However, two outer flaps with respective hinge s on opposite sides can also be provided. The outer flap(s) is/are in each case unitarily molded via the hinge 11 with an inner flap 4 that extends into the interior of the compartment 12 and thus the launch pocket. Here, the inner flap 4 is in contact with the inner face of the pocket side wall 9 and is securely attached to it. In the region of the hinge 11, the inner flap 4 has an expansion section 3 having folds 4a and 4b, so that when the outer flap 1 is opened and swung out, it moves outward by a spacing.

In the compartment 12 formed by the pocket side walls 9, there is an additional sheet 8 that covers but is not attached to the lower face of the outer flap 1 at least to a large extent with its upper part 8c lying between the folded impact bag 7 and the outer flap 1, without being connected tp the impact bag or the outer flap 1. Alternatively, the upper part 8c of the sheet 8 is securely attached to the outer flap 1, in particular welded thereto.

The sheet 8 has a lower part 8d extending into the interior of the compartment 12 along a pocket side wall 9. When the impact bag 7 is unfolded, it presses against the region 8c and pivots the region 8c with the outer flap 1 to the outside. Here, the region 8c is restrained by the lower region 8d of the sheet. Between the regions 8c and 8d, the connection region has a corrugated region 8e allowing the sheet 8 to stretch by an additional path length when the impact bag 7 presses the upper part to the outside. In this case, instead of the corrugated region 8e, the sheet 8 can also have a fold as a displacement reservoir, similar to the expansion section 3 of the inner flap 4.

The lower part 8d is securely attached to the pocket side wall 9 and/or to the inner flap 4 such that the sheet 8 is held securely during the unfolding of the impact bag 7 and does not fly into the vehicle interior. For this purpose, in the embodiment according to FIG. 1, the pocket side wall 9 has an undercut projection 9a extending toward the interior of the compartment 12 and under which engages a tongue 8a of the part 8d.

Figures 2, 3:
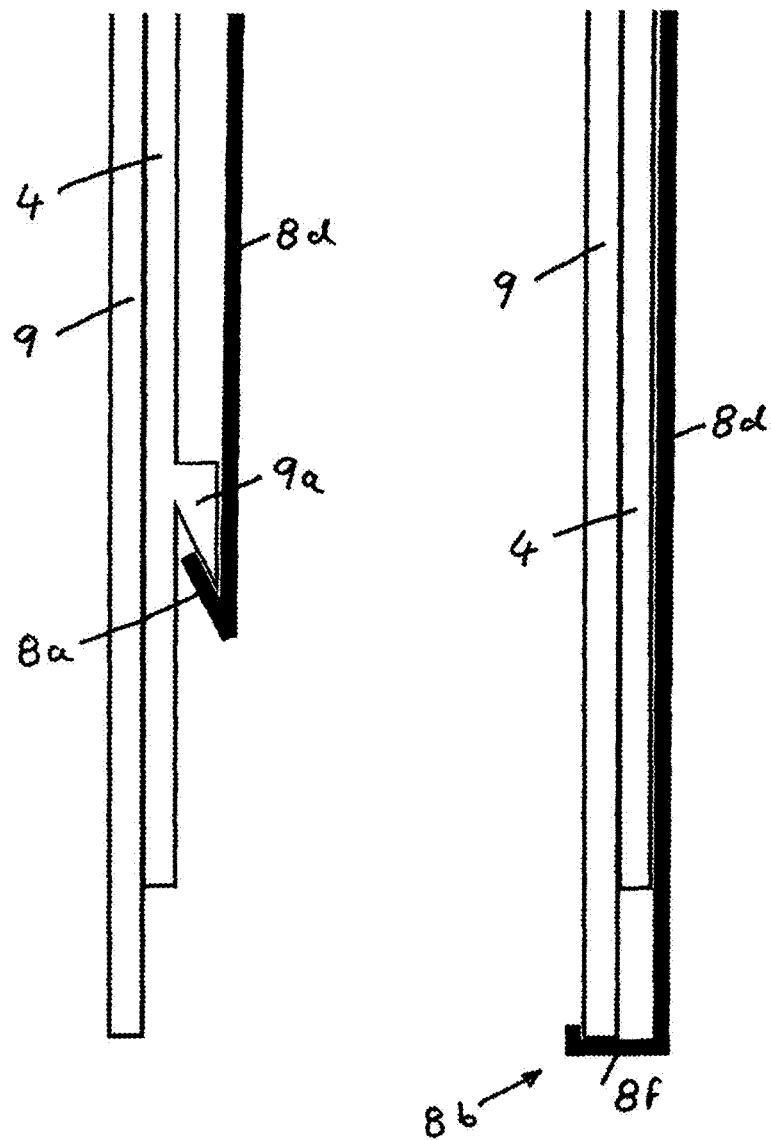
FIG. 2 shows a detail from FIG. 1, in which the tongue of the sheet engages under a projection of the inner flap.
FIG. 3 shows a detail from FIG. 1, in which the lower end of the sheet engages under the lower edge of the pocket side wall.

In the embodiment shown in FIG. 2, the inner flap 4 has on its inner face the undercut projection 9a. extending into the compartment 12 and that is hooked by a tongue 8a of the region 8d. In the embodiment shown in FIG. 3, the sheet 8 has a double U-shaped bend 8f at the lower end 8b of the part 8d and engaging engages under the lower edge of the pocket side wall 9. In a further embodiment (not shown), the lower end 8b of the sheet 8 engages under the lower end of the inner flap 4. In both versions, in which the lower end 8b is reached, pins can project from the lower end of the inner flap 4 and the pocket side wall 9 and engage in openings in the lower region of the lowermost end 8b of the lower part 8d in order to achieve a secure hold of the sheet 8.

In all versions, the sheet 8 reaches is securely anchored in the launch pocket since it is made of a stable material. It is a composite material (composite) consisting of at least two layers as a composite material having at least one layer made of plastic strips or fibers, in particular made of thermoplastic polypropylene or polyester. The plastic strips or fibers form a solid fabric as a closed textile material, in which the strips/fibers fuse together due to high heating. In addition, the sheet 8 can be coated on one or both sides with an adhesive film.

With all the above descriptions and graphic representations and information in the claims, it should be noted that the hinge s, expansion sections, corrugations and bends preferably extend over the entire length of the respective parts or objects.

The invention claimed is:

1. An airbag assembly comprising:
a launch pocket having a side wall;
an inflatable airbag in the pocket;
a plastic cover over the launch pocket, and formed with a hole;
an outer flap mold closing the hole and bonded to the cover, the cover having at least one target break line at the edge of the outer flap in order to enable unfolding of the airbag bag;
a hinge unitarily formed with the outer flap; and
an inner flap unitarily connected by the hinge to the outer flap and in secure contact with an inner face of the pocket side wall; and
a sheet inserted in the launch pocket between the airbag and the outer flap, having a lower part positively hooked under a lower end of the pocket side wall or the inner flap and a lateral tongue engaging behind a lateral projection of the pocket side wall or the inner flap, and at least partially covering the door outer flap and the inner face of the pocket side wall.

2. The airbag assembly according to claim 1, wherein the sheet consists of a composite material with at least one layer of plastic strips or fibers of thermoplastic polypropylene or polyester.

3. The airbag assembly according to claim 2, wherein the plastic strips or fibers form a fabric.

4. The airbag assembly according to claim 1, wherein at the hinge the sheet has a material reservoir in the form of an expansion section or corrugation along the hinge and enabling the sheet to be stretched lengthwise to the outside.

\* \* \* \* \*